UNITED STATES PATENT OFFICE.

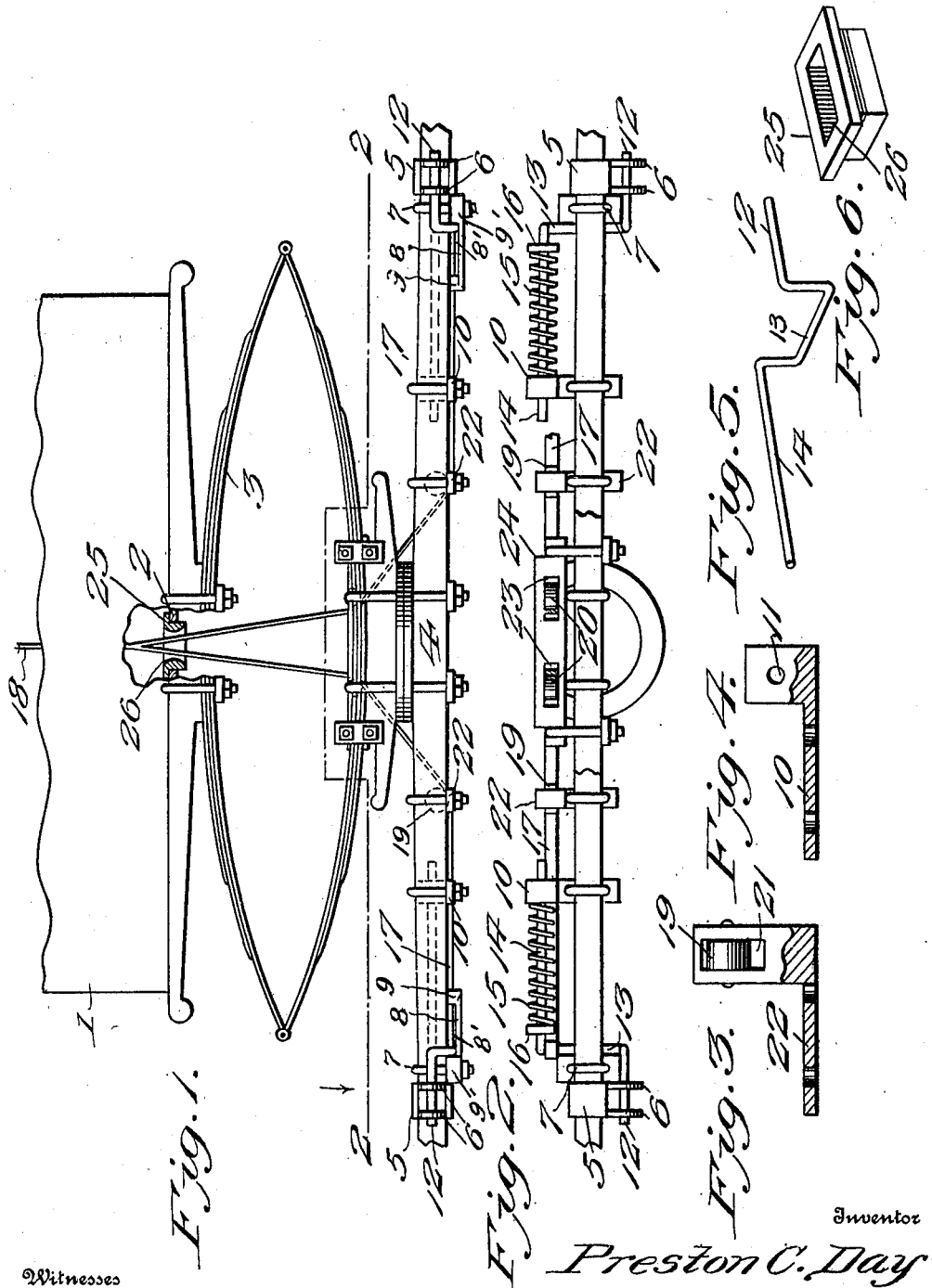

PRESTON C. DAY, OF AUGUSTA, OKLAHOMA.

HORSE-DETACHER.

980,074.   Specification of Letters Patent.   Patented Dec. 27, 1910.

Application filed October 23, 1908. Serial No. 459,185.

To all whom it may concern:

Be it known that I, PRESTON C. DAY, a citizen of the United States, residing at Augusta, in the county of Woods and State of Oklahoma, have invented new and useful Improvements in Horse-Detachers, of which the following is a specification.

This invention relates to horse detachers, being especially directed to mechanisms for detachably connecting the vehicle thills with the axle and embodies in its organization a pair of movable thill engaging members or bolts, together with means for moving said members automatically to engaging position, and means for positively moving the members to releasing position for uncoupling the thills from the axle.

The invention has for its objects to provide a comparatively simple, inexpensive device of this character wherein the thills will, under normal conditions, be securely coupled to the axle, and one wherein the mechanism may be conveniently operated for uncoupling the thills when circumstances require in the exigency of detaching the animal from the vehicle.

With these and other objects in view, the invention comprises the novel features of construction and combination of parts more fully hereinafter described.

In the accompanying drawings: Figure 1 is a front elevation of a portion of a vehicle equipped with a thill detaching mechanism embodying the invention. Fig. 2 is a horizontal, sectional plan, the section being taken on the line 2—2 of Fig. 1. Fig. 3 is a detail view of one of the roller carrying brackets. Fig. 4 is a similar view of one of the guide brackets. Fig. 5 is a perspective view of one of the coupling members. Fig. 6 is a similar view of the guide box.

Referring to the drawings, 1 designates a vehicle body having a bottom 2 and sustained on an axle 4 provided with bearings 5 each presenting a pair of spaced, forwardly projecting ears 6 designed to receive between them the rear ends of the thills, not shown.

Attached to the axle 4 at points adjacent to the bearings by means of clip bolts 7 are guide members 8 having stop ears 9. Guide brackets 10 on the axle are provided with circular guide openings 11.

Extended crosswise between the ears 6 and for sliding movement in suitable bearing openings therein are thill couplings or bolts 12, each having an angularly disposed cross portion 13 extended transversely of the axle. The bolts are each provided with an inwardly projecting, longitudinal stem 14 slidably disposed between its ends in the adjacent guide opening 11, there being arranged on each of the stems 14 a normally expanded spring 15 which bears at one end on the companion bracket 10 and at its other end against a stop head 16 provided on the stem, the spring serving to press the bolts 12 to active or coupling position.

Engaged at their outer ends with the portions 13 of the coupling members is a pair of flexible traction elements or straps 17, which are joined at their inner ends to a common operating strap 18 and are arranged for travel between their ends over guide rollers 19 and 20, of which the former are journaled in suitable guide openings 21 provided in guide brackets 22 attached to the axle 4, while the latter are journaled in guide openings 23 provided in a bearing block 24 bolted to the axle.

In practice, the rear ends of the thills are arranged respectively between the pairs of ears 6, in which they are journaled for vertical swinging movement through the medium of the coupling members or bolts 12 and connected by the latter with the axle 4. In the event of a runaway, the draft animal may be detached from the vehicle by traction on the strap 18 which through the medium of the branch straps 17 will retract the bolt 12 against the action of springs 15, thereby uncoupling the thills from the axle. As soon as traction is relieved on the strap 18, the springs 15 will automatically return the bolts to coupling position, as will be readily understood.

The straps 17 are, by preference, passed upward into the body of the vehicle through an open bearing box 25 having rounded, inner end walls 26 over which the straps play, the bearing box being fitted in a suitable opening formed in the bottom 2 of the vehicle body.

The construction of the guide members 8 is such that each is provided with a recessed portion 8' for slidably receiving the portion 13 of the sliding bolt, the portion 9' being constructed to serve as a stop to limit the outward sliding movement of the bolt and the ears 9 serving as stops to limit the inward sliding movement of the bolt.

Having thus described my invention, what I claim is:

In a horse releasing device, the combination with an axle, of end members secured thereto and provided with forwardly extending apertured ears, guide members supported by the axle and disposed on the underside thereof adjacent to the said end members, the said guide members having recesses formed therein, the said guide members each having its outer end formed to provide a stop and having its inner end formed to provide a stop, sliding bolts operating in the apertures of the ears, the said bolts having their inner ends extended downwardly and offset to provide portions which are slidably engaged in the recesses in the guide members, the said bolts having their extremities extended longitudinally of the axle, brackets slidably supporting the extremities of the bolts, stops located on the extremities of the bolts, extensile springs surrounding the extremities and confined between the said stops and the brackets, and flexible actuating elements operatively connected with the said bolts to move them against the tension of the said extensile springs.

In testimony whereof, I affix my signature in presence of two witnesses.

PRESTON C. DAY.

Witnesses:
 ROY HUNGERFORD,
 GEO. WEABER.